United States Patent
Nagami

(10) Patent No.: US 7,962,592 B2
(45) Date of Patent: Jun. 14, 2011

(54) SYSTEM AND METHOD FOR NETWORK MANAGEMENT

(75) Inventor: Kenichi Nagami, Tokyo (JP)

(73) Assignee: Cloud Scope Technologies, Inc., Tokyo (JP)

( * ) Notice: Subject to any disclaimer, the term of this patent is extended or adjusted under 35 U.S.C. 154(b) by 1029 days.

(21) Appl. No.: 11/339,580

(22) Filed: Jan. 26, 2006

(65) Prior Publication Data

US 2006/0168208 A1 Jul. 27, 2006

(30) Foreign Application Priority Data

Jan. 27, 2005 (JP) ................................ 2005-020234

(51) Int. Cl.
*G06F 15/173* (2006.01)
*G06F 15/177* (2006.01)
(52) U.S. Cl. ......... 709/223; 709/224; 715/735; 715/736
(58) Field of Classification Search .................. 709/223, 709/224; 715/735, 736
See application file for complete search history.

(56) References Cited

U.S. PATENT DOCUMENTS

| | | | | |
|---|---|---|---|---|
| 5,909,549 A | * | 6/1999 | Compliment et al. | 709/223 |
| 5,999,179 A | * | 12/1999 | Kekic et al. | 715/734 |
| 6,269,396 B1 | * | 7/2001 | Shah et al. | 709/223 |
| 6,490,617 B1 | * | 12/2002 | Hemphill et al. | 709/223 |
| 2001/0052006 A1 | * | 12/2001 | Barker et al. | 709/223 |
| 2002/0078174 A1 | * | 6/2002 | Sim et al. | 709/219 |
| 2002/0099806 A1 | * | 7/2002 | Balsamo et al. | 709/223 |
| 2002/0174207 A1 | * | 11/2002 | Battou | 709/223 |
| 2003/0063613 A1 | * | 4/2003 | Carpini et al. | 370/401 |
| 2003/0112749 A1 | * | 6/2003 | Hassink et al. | 370/225 |
| 2003/0149769 A1 | * | 8/2003 | Axberg et al. | 709/225 |
| 2005/0220030 A1 | | 10/2005 | Nagami et al. | |

OTHER PUBLICATIONS

Manufacturing Part No. T2490-90024, Jul. 2004, pp. 1-146, Hewlett-Packard Development Company, L.P..

* cited by examiner

*Primary Examiner* — Ranodhi N Serrao
(74) *Attorney, Agent, or Firm* — Birch, Stewart, Kolasch & Birch, LLP.

(57) ABSTRACT

A part of the elements discovered in a network are chosen to be monitored, and a user such as a network administrator is allowed to appropriately monitor desired elements. A network management server collects information on elements in the network, and displays collected information on a GUI screen. The user is allowed to choose an element based on the information displayed on the screen, and the element chosen by the user is then registered as an object to be monitored. Information is collected including elements which are not registered, and displayed on the screen along with a result of comparison to the registered elements.

12 Claims, 16 Drawing Sheets

| ITEM TYPE | ITEM IDENTIFIER | INFORMATION |
|---|---|---|
| NODE | 1.1.1.1 | NODE NAME, VENDOR NAME, ... |
| LSP | 1.1.2.2: Tokyo-Osaka (LSP NAME) | BANDWIDTH, LSP PASSING-THROUGH POINT, ... |
| LINK | 2.2.2.2-3.3.3.3 | INTERFACE TYPE, ... |

FIG. 5

```
AutoDiscovery
─────────────────────────────────────────────

CHOOSE OBJECTS TO BE DISCOVERED

Choose the type of object to be discovered.
      ☐ NODE DISCOVERY
      ☐ LINK DISCOVERY
      ☐ RSVP-LSP DISCOVERY

[ << Back ]  [ Next >> ]  [ Cancel ]
```

FIG. 6

AutoDiscovery

1. SET NODES TO BE DISCOVERED

○ DISCOVER ALL NODES

○ DISCOVER DESIGNATED NODES ONLY

List below becomes operative only when this option is chosen.

[  ] → 10.2.3.1
10.2.2.4
10.3.4.2    Delete

Add Designated Node

Add All Nodes

2. SET LIST OF NODES TO BE OMITTED FROM DISCOVERY

IP ADDRESS

[  ] → 10.2.3.1
10.3.4.7    Delete

AutoDiscovery will be carried out on designated nodes when the "Next" button is clicked.

<< Back   Next >>   Cancel

FIG. 7

AutoDiscovery

Nodes listed below have been discovered.

NODES THAT CAN BE NEWLY ADDED   Choose All-Clear All

- Node1
- Node2

*Object will be displayed in detail when double-clicked.*

☐ Add
  ☐ Add
  ☐ Add
  ☐ Add

Delete lower suffix:
[        ]
[ Set ]

NODES WHOSE INFORMATION CAN BE UPDATED   Choose All-Clear All

- Node3
- Node4

*Object on the screen will be highlighted when clicked.*
  *Object will be displayed in detail when double-clicked.*

☐ Update
  ☐ Update
  ☐ Update

Delete lower suffix:
[        ]
[ Set ]

NODES THAT CAN BE DELETED   Choose All-Clear All

- Node5

*Object on the screen will be highlighted when clicked.*
  *Object will be displayed in detail when double-clicked.*

☐ Delete
  ☐ Delete

Errors listed below occurred during discovery.

| error MESSAGE |                |
| error MESSAGE [OBJECT:node1] | ☐ Rediscover |

[ Execute Rediscovery ]

Checked nodes will be added, updated, or deleted when the "Next" button is clicked.

[ << Back ]   [ Next >> ]   [ Cancel ]

*FIG. 8*

AutoDiscovery

SET LINKS TO BE DISCOVERED

○ DISCOVER ALL LINKS
○ DISCOVER ONLY LINKS INCLUDED IN OSPF AREA
○ DISCOVER ONLY LINKS BETWEEN DESIGNATED NODES

List below becomes operative only when this option is chosen.

Add Designated Node 10.2.3.1
10.2.2.4
10.3.4.2

Delete

SET NODES AND LINKS TO BE OMITTED FROM DISCOVERY

IP ADDRESS OF NODE TO BE OMITTED
→
10.2.3.1
10.3.4.7
Delete

PREFIX OF LINK TO BE OMITTED
→
10.2.3.1 net1
10.2.2.4 net2
10.3.4.2 net3
Delete

NETMASK

AutoDiscovery will be carried out on designated nodes when the "Next" button is clicked.

<< Back    Next >>    Cancel

FIG. 10

AutoDiscovery

Links listed below have been discovered.

LINKS THAT CAN BE NEWLY ADDED    Choose All-Clear All

| link1 | Object will be displayed in detail when double-clicked. | ☐ Add |
| link2 | | ☐ Add |
| link4 | | ☐ Add |
| | | ☐ Add |

LINKS WHOSE INFORMATION CAN
BE UPDATED    Choose All-Clear All

| link3 | Object on the screen will be highlighted when clicked. | ☐ Update |
| link4 | | ☐ Update |
| link2 | Object will be displayed in detail when double-clicked. | ☐ Update |

LINKS THAT CAN BE DELETED    Choose All-Clear All

| link3 | Object on the screen will be highlighted when clicked. | ☐ Delete |
| link4 | Object will be displayed in detail when double-clicked. | ☐ Delete |

Errors listed below occurred during discovery.

| error MESSAGE | |
| error MESSAGE [OBJECT:link1] | ☐ Rediscover |

[ Execute Rediscovery ]

Checked links will be added, updated, or deleted
when the "Next" button is clicked.

[ << Back ]    [ Next >> ]    [ Cancel ]

*FIG. 11*

AutoDiscovery

SET LSPS TO BE DISCOVERED

○ DISCOVER ALL RSVP-LSPS

○ DISCOVER ONLY RSVP-LSPS WHOSE INGRESS NODES ARE DESIGNATED NODES

> List below becomes operative only when this option is chosen.

- [ ] → 
- Add Designated Node
- Add All Nodes 10.2.3.1
10.2.2.4
10.3.4.2

Delete

SET NODES AND LINKS TO BE OMITTED FROM DISCOVERY

IP ADDRESS OF NODE TO BE OMITTED
[ ] →

10.2.3.1
10.3.4.7

Delete

PREFIX OF LINK TO BE OMITTED
[ ] →
NETMASK
[ ]

10.2.3.1 net1
10.2.2.4 net2
10.3.4.2 net3

Delete

[<< Back] [Next >>] [Cancel]

*FIG. 13*

AutoDiscovery

LSPs listed below have been discovered.

LSPS THAT CAN BE NEWLY ADDED     Choose All-Clear All

| | |
|---|---|
| rsvp-lsp_b2 | ☐ Add |
| Rsvplsp_a *Object will be displayed in* | ☐ Add |
| Rsvp3 *detail when double-clicked.* | ☐ Add |
| x_rsvp_lsp-1 | ☐ Add |

LSPS WHOSE INFORMATION CAN BE UPDATED     Choose All-Clear All

| | |
|---|---|
| rsvp3 — *Object on the screen will be highlighted when clicked.* | ☐ Update |
| RSVPLSP2 | ☐ Update |
| *Object will be displayed in detail when double-clicked.* | ☐ Update |

LSPS THAT CAN BE DELETED     Choose All-Clear All

| | |
|---|---|
| rsvp-lsp_a1 — *Object on the screen will be highlighted when clicked.* | ☐ Delete |
| *Object will be displayed in detail when double-clicked.* | ☐ Delete |

Errors listed below occurred during discovery.

| | |
|---|---|
| error MESSAGE | |
| error MESSAGE [OBJECT:rsvp-lsp5] | ☐ Rediscover |

[ Execute Rediscovery ]

Checked LSPs will be added, updated, or deleted
when the "Next" button is clicked.

[ << Back ]  [ Next >> ]  [ Cancel ]

*FIG. 14*

SYSTEM AND METHOD FOR NETWORK MANAGEMENT

BACKGROUND OF THE INVENTION

1. Field of the Invention

The present invention relates to technologies for allowing a user (e.g., network administrator) to manage the Internet or other networks using a graphic screen of a computer (e.g., network management station) provided at one place, particularly to a mechanism for selectively registering a network element as an object to be monitored. A node, a link, a label switched path (LSP), or the like can be the network element.

2. Background

As networks are becoming large-scale and complex, and as end users' demands are becoming more sophisticated, it is becoming increasingly difficult for network administrators to maintain a network day and night so that the network continues to provide reliable and high-quality services. It is also becoming increasingly desirable to manage a network not reactively but proactively.

Under these circumstances, it is becoming important to collect a lot of information on the current state of a network (e.g., what device exists in a network and what its setting and operating conditions are, at what level the network performance is and where the problem is now, or the like). This is because, if an administrator can know the current network status in detail, it becomes possible to optimize the network by changing the configuration, adding or replacing devices, or the like, and it also becomes possible not just to detect and handle a network fault at an early stage but also to anticipate a fault and prevent a future problem.

Network management includes, for example, fault management, performance management, configuration and change management, accounting management, and security management. A known example of a tool for doing such network management is "HP OpenView Network Node Manager" provided by Hewlett-Packard Japan, Ltd. (see its corresponding English version: "HP OpenView Network Node Manager; Managing Your Network with HP OpenView Network Node Manager," July, 2004, http://ovweb.external.hp-.com/ovnsmdps/pdf/t2490-90024.pdf).

Fault management is to detect, isolate, and control faults in a network, and requires a tool for monitoring the current state of the network and activating an alarm. Performance management is to measure the performance of network hardware, software, and media, such as throughput rate, percentage utilization, error rates, and response time, through the collection and analysis of data about the network. Configuration and change management is to find and set up devices that control the behavior of a network, and the setting can be done by central control. Accounting management is to acquire statistical information on network use (e.g., resource consumption). Security management is to protect a network and its interconnections, systems, and network management information from unauthorized access and use.

The HP tool can display a network topology map. Using a protocol called SNMP (Simple Network Management Protocol) that works on TCP/IP, IPX, UDP, or other communications protocols, the tool can acquire data from devices in a network and inform, on the above map, a network administrator of an alarm based on the acquired data.

SNMP is implemented via an SNMP manager program installed on a network management station and via an SNMP agent program being resident in a required node in a network. This allows two ways for the network management station to collect above data for monitoring. One method is that the SNMP manager acquires data by polling, which is responded by each SNMP agent. The other method is that the SNMP manager acquires data by receiving a trap (notification) from an SNMP agent without sending an explicit request.

In order to manage a network as described above, data, which may change every moment, are acquired from devices in the network at a frequency appropriate for the management, and each element (e.g., node, link) in the network is monitored based on the acquired data. That is, the current state of each element is found out.

SUMMARY OF THE INVENTION

According to methods and systems consistent with the invention, a part of the elements (e.g., nodes, links, LSPs) discovered in a network can be chosen to be monitored, and elements desirable for an user such as a network administrator can be appropriately monitored.

A network management device consistent with the invention may comprise: a collection unit that collects information on elements in a network; a display unit that displays information collected by the collection unit on a screen; a choice unit that allows a user to choose an element based on the information displayed by the display unit; a registration unit that registers the element chosen by the user through the choice unit as an object to be monitored; and a control unit that controls the display unit to display a result of comparison between information on the element registered as the object to be monitored and information collected by the collection unit, the collection unit being to collect information on elements including an element not registered as an object to be monitored.

A network management method consistent with the invention may comprise: collecting first information on elements in a network; displaying information collected as the first information on a screen; allowing a user to choose a first element based on the information displayed on the screen; registering the first element chosen by the user in a server as an object to be monitored; collecting second information on elements in the network, the elements including an element not registered in the server; displaying information with a result of comparison between information on the first element registered in the server and the second information on the screen; allowing the user to choose a second element based on the information with the result of comparison displayed on the screen; and altering registration of elements to be monitored in the server in accordance with the second element chosen by the user.

In a computer usable medium having computer readable program codes embodied therein for a computer functioning as a network management device connected with a network, the computer readable program codes consistent with the invention may comprise: a collection code module causing the computer to collect information on elements in the network; a display code module causing the computer to display information collected by the collection code module on a screen; a choice code module causing the computer to allow a user to choose an element based on the information displayed by the display code module; and a registration code module causing the computer to register the element chosen by the user through the choice code module as an object to be monitored, wherein the display code module causes the computer to display a result of comparison between information on the element registered as the object to be monitored and information collected by the collection code module, the information collected by the collection code module including information on an element not registered as an object to be monitored.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

FIG. 5 shows an example of a format in which node information, link information, and LSP information are stored in the information storage section 18;

FIG. 6 shows an example of a screen for allowing a user to instruct a kind of object to be discovered;

FIG. 7 shows an example of a screen for allowing a user to designate a node to be discovered;

FIG. 8 shows an example of a screen for displaying a node discovery result and allowing a user to choose an object to be registered;

FIG. 10 shows an example of a screen for allowing a user to designate a link to be discovered;

FIG. 11 shows an example of a screen for displaying a link discovery result and allowing a user to choose an object to be registered;

FIG. 13 shows an example of a screen for allowing a user to designate an LSP to be discovered;

FIG. 14 shows an example of a screen for displaying an LSP discovery result and allowing a user to choose an object to be registered;

DETAILED DESCRIPTION

Figure 1:
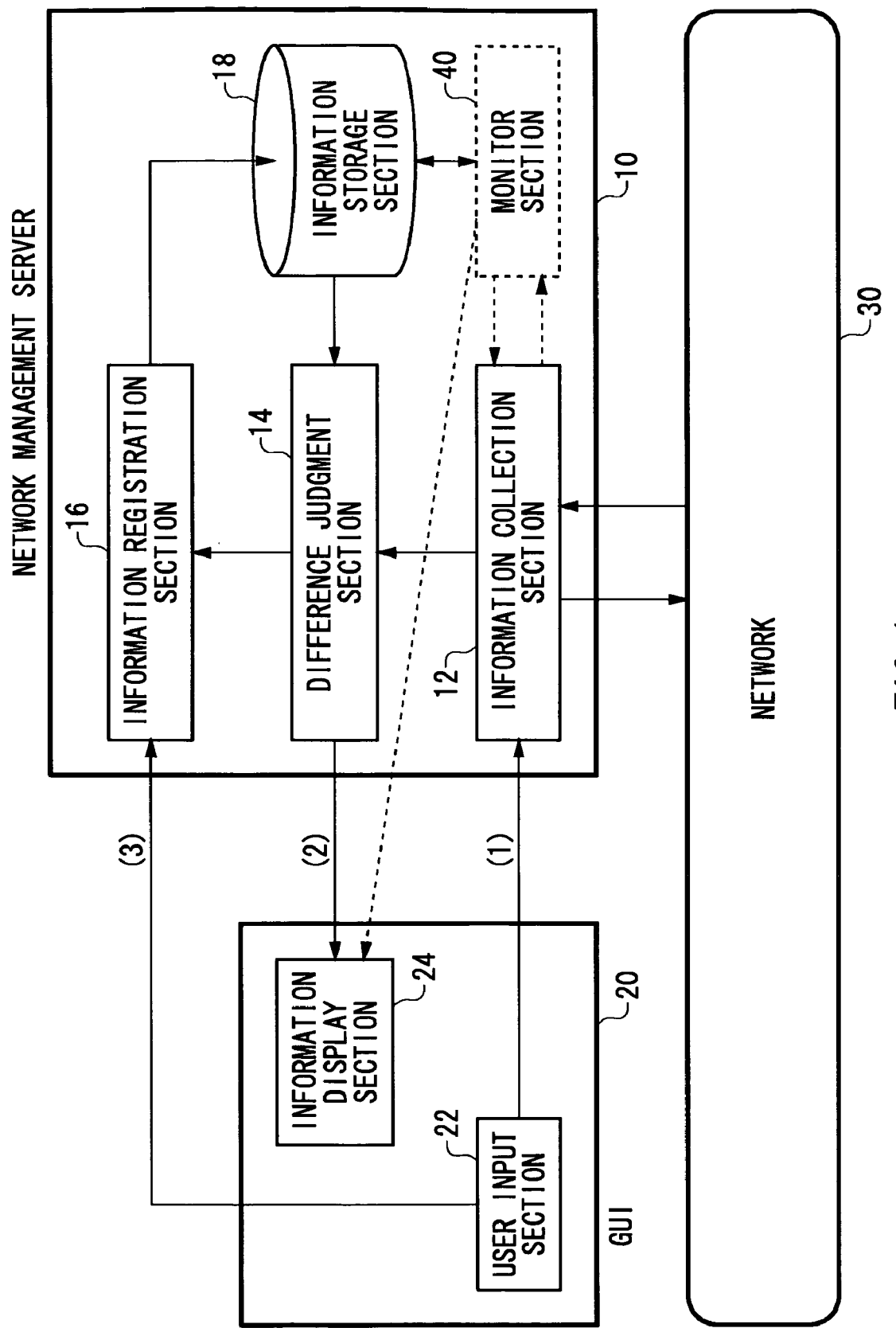
FIG. 1 shows an example of system configuration including a network management server 10 and a GUI 20 according to an embodiment of the invention.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

General Description

In order to acquire data for the network management, since there usually are enormous numbers of elements in a network, the amount of traffic and processing load on each device for data acquisition will be too large if all the elements are polled as objects to be monitored. Additionally, if all data from all devices having trap (notification) function are shown to a network administrator, he/she will be at risk of overlooking really important notifications due to the enormous amount of data.

On the other hand, to start a process to monitor network elements, investigation may be required in advance on what elements exist in the network. This investigation can be carried out by a network management station searching the network for nodes and collecting information on links that connect between nodes which are found to exist, through communications with devices. This technology is sometime called automatic network topology discovery. This automatic discovery can discover all the elements in a network.

Conventional network management systems have a mechanism in which, when all the network elements are discovered by automatic discovery, all the discovered elements are in principle registered as objects to be monitored. Therefore, even if network administrators try to make only a part of the elements be monitored in consideration of the above-described problem of the amount of traffic, processing load, and risk of overlooking, it will be difficult to make their systems operate as desired.

For example, in practical operation of network management, a sequence may be repeated as follows: elements to be monitored are identified by automatic discovery; monitoring the identified elements is continued for a while; then, automatic discovery is done again to investigate whether any new elements are added to the network and whether any once-existed elements are deleted from the network, so that elements to be monitored next are identified; and monitoring the newly identified elements is continued for a while.

Supposing, on and after the second automatic discovery in the above sequence, newly found added elements are automatically added to registration as objects to be monitored and newly found deleted elements are also automatically deleted from registration as objects to be monitored, it will be difficult for network administrators to make elements they really want to monitor be objects to be monitored. Supposing, after all the elements are once registered as objects to be monitored, a part of the elements are omitted from the objects to be monitored, the omitted elements will be also omitted from objects of the next automatic discovery, and therefore network administrators will no longer be able to find out the elements by automatic discovery even if they later desire to add the elements as objects to be monitored.

Methods and systems consistent with the invention take an approach different than those of the above supposed mechanisms.

An example of a network management device consistent with the invention comprises: a collection unit that collects information on elements in a network; a display unit that displays information collected by the collection unit on a screen; a choice unit that allows a user to choose an element based on the information displayed by the display unit; a registration unit that registers the element chosen by the user through the choice unit as an object to be monitored; and a control unit that controls the display unit to display a result of comparison between information on the element registered as the object to be monitored and information collected by the collection unit, the collection unit being to collect information on elements including an element not registered as an object to be monitored.

In this configuration, an element that a user such as a network administrator wants to monitor can be chosen from elements whose information is collected (e.g., automatically discovered), before being registered as an object to be monitored. Since automatic discovery done after registering a part of the elements as objects to be monitored covers non-registered elements as well, even an element that was not at first an object to be monitored can easily be added to objects to be monitored, by choosing among a displayed result of the later automatic discovery. On and after the second automatic discovery, a result of every automatic discovery is displayed with a result of comparison to information on registered elements, and a desired object to be monitored can be chosen anew from the displayed result and be registered.

The network management device with the above configuration may further comprise a monitor unit that acquires data for management of the network by inquiring about a current state of the element registered as the object to be monitored, and shows the data to the user. This can limit objects to be polled for monitoring to a part of the elements, and can reduce the amount of traffic and processing load on each device for data acquisition.

Alternatively or additionally, the network management device with the above configuration may further comprise a monitor unit that receives an event notification indicating a change in state of the network, and shows the user a notification concerning the element registered as the object to be monitored in distinction from a notification concerning an element not registered as an object to be monitored. This allows a user to become aware of data that is more likely to be important for network management, among data that are received from many devices having the trap (notification) function.

In the above configuration, the control unit may control the display unit to display: an element which can be added if information on an element not registered as an object to be monitored is collected by the collection unit; an element which can be updated if information on the element registered as the object to be monitored is collected by the collection unit; and an element which can be deleted if information on the element registered as the object to be monitored is not collected by the collection unit. This allows a user to recognize whether the result of each automatic discovery on and after the second automatic discovery indicates: that a new element (i.e., an element newly added to the network, or an element not chosen before as an object to be monitored) is discovered; that a registered element is deleted from the network: or that a registered element is discovered anew where information may have changed. Therefore, it is easy for the user to choose anew a desired object to be monitored.

The network management device with the above configuration may further comprise a designation unit that allows the user to designate an element whose information is to be collected by the collection unit. Since automatic discovery itself increases load on the network as polling for monitoring does, it is useful to limit the area of the network in which automatic discovery is carried out. In a case where an element that was added, deleted, changed, or the like is known in advance and automatic discovery is done in order to register the known element as an object to be monitored, it is also useful to limit objects of automatic discovery to the element and objects related to the element.

In these cases, the registration unit may register information on each element along with a date and time of registration, and the designation unit may include a unit that shows the user the element registered by the registration unit along with the date and time of registration. This allows a user to recognize when information on the element registered is as of, and thus assists the user in designating to limit the scope of automatic discovery for avoiding unnecessary redundancy.

The network management device with the above configuration may further comprise an instruction unit that allows the user to instruct that information on which kind of element in the network is to be collected by the collection unit among a node, a link, or a label switched path (hereinafter referred to as "LSP"). Because collecting information on all the nodes and links in automatic discovery causes the network load to increase, it may be useful to allow discovery of nodes only or links only as required. Additionally, as the inventor of the present invention has invented a mechanism to monitor an LSP (U.S. Patent Application Publication No. US 2005/0220030 A1), an LSP can also be an element to be discovered automatically and be monitored consistently with the principle of the present invention.

The network may include a node and a link as elements. In the above configuration, the registration unit registers a node as the object to be monitored, and the collection unit collects information on a link connected to the node registered when collecting information on links. In this case, for example, in a case where a user instructs to collect information on nodes and links, automatic discovery is done first for nodes and a part of discovered nodes are chosen to be registered as objects to be monitored, and then automatic discovery can be done targeting links connected to the registered nodes. This is effective since this allows automatic discovery of links to be limited to a required scope.

Alternatively or additionally, in the above configuration, the registration unit registers a node as the object to be monitored, and the control unit controls the display unit to display an error in a case where information collected by the collection unit is on a link not connected to the node registered. In this case, for example, in a case where a user instructs to collect information on links only, an error is displayed if a link not connected to a registered node is discovered, and therefore a user can take a step of either registering the node to which the link is connected, or not registering the link since the node is not registered. This can allow registration of objects to be monitored to be free of inconsistency.

The network may include a node, a link, and an LSP as elements. In the above configuration, the registration unit registers a node as the object to be monitored, and the collection unit collects information on an LSP set up regarding the node registered when collecting information on LSPs. In this case, for example, in a case where a user instructs to collect information on nodes and LSPs, automatic discovery is done first for nodes and a part of discovered nodes are chosen to be registered as objects to be monitored, and then automatic discovery can be done targeting LSPs set up on the registered nodes. This is effective since this allows automatic discovery of LSPs to be limited to a required scope.

Alternatively or additionally, in the above configuration, the registration unit registers a node as the object to be monitored and registers a link as the object to be monitored, and the control unit controls the display unit to display an error in a case where information collected by the collection unit is on an LSP not set up regarding the node registered and in a case where information collected by the collection unit is on an LSP not using the link registered. In this case, for example, in a case where a user instructs to collect information on LSPs only, an error is displayed if an LSP not set up on a registered node to use a registered link is discovered, and therefore a user can take a step of either registering the node and the link related to the LSP, or not registering the LSP since the related elements are not registered. This can allow registration of objects to be monitored to be free of inconsistency.

An example of a network management method consistent with the invention comprises: collecting first information on elements in a network; displaying information collected as the first information on a screen; allowing a user to choose a first element based on the information displayed on the screen; registering the first element chosen by the user in a server as an object to be monitored; collecting second information on elements in the network, the elements including an element not registered in the server; displaying information with a result of comparison between information on the first element registered in the server and the second information on the screen; allowing the user to choose a second element based on the information with the result of comparison displayed on the screen; and altering registration of elements to be monitored in the server in accordance with the second element chosen by the user.

The principle of the invention may also be realized by a program for making a computer function as the above network management device, by a program for making a computer execute the above network management method, or by a recording medium on which such program is recorded.

As described above, systems and methods consistent with the invention can relate finding out elements existing in a network by automatic discovery, to making only a part of the elements be objects to be monitored to find out the current state, by means of an interface that is easy for network administrators to use.

Description with Reference to Drawings

Exemplary embodiments of the above-described configuration will be described below with reference to the drawings.

FIG. 1 shows an example of system configuration including a network management server 10 and a GUI (Graphical User Interface) 20 according to an embodiment of the invention. The network management server 10 is connected to a network 30 to be managed. The network management server 10 and the GUI 20 are illustrated in the figure as different devices from each other, and they can be configured in such a manner that one network management server 10 can be used from a plurality of GUIs 20 (remote consoles, or computers that have access to the network management server 10 via the network 30). Alternatively or additionally, the GUI 20 may be embedded and implemented in the network management server 10. The network 30 includes many nodes, links connecting neighboring nodes, LSPs that enable fast transfer between non-neighboring nodes via one or more nodes by connecting a plurality of links with switching, or other elements. LSPs are realized by a standardized technology called MPLS (Multiprotocol Label Switching).

The network management server 10 is connected to the network 30, and comprises: an information collection section 12 for acquiring information from the network; an information storage section 18 such as a database in which information can be stored; a difference judgment section 14 for comparing information collected by the information collection section 12 with information stored in the information storage section 18; and an information registration section 16 for registering in the information storage section 18 a part of information collected by the information collection section 12 in accordance with a signal received from the GUI 20. The network management server 10 is generally implemented by installing a software program for realizing the functions of the above sections in a computer having enough storage capacity and program execution performance. It may also be implemented with a part of the above functions realized in dedicated hardware.

The GUI 20 comprises: a user input section 22 for sending the information registration section 16 a signal indicating information to be registered, and for sending the information collection section 12 a signal to specify the scope within which information is to be collected; and an information display section 24 for displaying information presented by the network management server 10. The GUI 20 is generally implemented with a display, a keyboard and mouse, and a function to connect with the network management server 10.

The network management server 10 can be configured such that the server itself operates as a monitor server, and in that case it comprises a monitor section 40. The monitor section 40 selectively monitors the current state (e.g. presence or absence of fault, degree of the fault, communication quality, amount of traffic, or the like) of nodes, links, LSPs, and other network elements registered in the information storage section 18. That is, for example, the monitor section 40 performs polling on the elements registered in the information storage section 18 to investigate the current state. Alternatively or additionally, when informed of a change in state that occurred in a certain element, the monitor section 40 displays the notification if the change occurred on one of the elements registered in the information storage section 18.

Polling can be implemented by the monitor section 40 sending an SNMP request from the information collection section 12 to registered elements and receiving their responses via the information collection section 12. The monitor section 40 displays on the information display section 24 the current state of the network 30 that became clear as a result of polling. This polling by the information collection section 12 can also be implemented by CLI (Command Line Interface), XML (extensible Markup Language), or the like, as well as by SNMR Upon receiving an SNMP trap (notification) that was sent to the information collection section 12 when an important event occurred in a certain element, the monitor section 40 records the notification. If the event is of an element not registered, the monitor section 40 merely performs recording, but if the event is of a registered element, the monitor section 40 additionally displays the notification on the information display section 24. A map view of the network topology may be used for the display on the information display section 24. This event-driven information reception can also be implemented by monitoring syslog, OSPF (Open Shortest Path First), BGP (Border Gateway Protocol), or other protocols, as well as by receiving SNMP traps.

If the network management server 10 is provided separately from a monitor server, the monitor server comprises, for example, the information storage section 18 and the monitor section 40. In this case, in the network management server 10, the difference judgment section 14 refers to and the information registration section 16 writes into the information storage section 18 of the monitor server. In the above example, the information collection section 12 is shared between the monitor server and the network management server 10. Alternatively, the function may be divided in such a manner that the information collection section 12 of the network management server 10 has an information collection function required for automatic discovery, which will be described later, and that the monitor server is provided additionally with a communications section connected to the network 30, the communications section having an information collection function required for monitoring, which includes the above-described function of polling, trap (notification), or the like.

The information collection section 12 of the network management server 10 performs automatic discovery (also called "Auto Discovery") before monitoring by the monitor section 40. For this purpose, the section has a function for acquiring information managed by and stored in the nodes located in a network. Elements that may correspond to nodes include, for example, routers, gateways, hosts, terminal servers, Ethernet switches, or other network devices. Information acquisition like this can be realized in such a manner that, for example, the information collection section 12 is an SNMP manager; each node is installed with an SNMP agent; and in response to an SNMP request sent from the manager, each agent sends back management information (node information, link information, LSP information, or the like described later) held in the node in which the agent is installed. The information acquisition can also be implemented by telnet or the like, as well as by SNMP.

As for monitoring, object elements are specified before the start of monitoring, so all destinations to which an SNMP request is to be sent are determined beforehand. However, in automatic discovery, what elements exist is not always known before the start of discovery. Therefore, in one method, information is collected in such a spreading manner that, for example: an SNMP request is sent to one node known to exist; information on its neighboring nodes is acquired from the response sent back; new SNMP requests are sent to the nodes newly specified by the acquired information; information on their neighboring nodes is acquired from the responses sent back; and so forth. Alternatively, in a case where a routing protocol that collectively manages topology information, such as OSPF or IS-IS (Intermediate System-to-Intermediate System), is running on the network, the routing information can be acquired first, and thus SNMP requests are sent to the nodes specified all together in the routing information.

Also for links and LSPs, in one method, information is collected in such a spreading manner as described above, from all nodes within a scope where automatic discovery is to be performed. In another method, as to links indicated in OSPF or IS-IS routing information, each link information is requested from its corresponding node. The OSPF and the IS-IS works only within a network called AS (Autonomous System), which is operated under a common policy or identical management, and routing between ASs is realized, for example, by the BGP. Information on this BGP session or BGP path information can be acquired to be used for automatic discovery of nodes and links, too. An LSP is set up by exchanging messages, such as RSVP (Resource reSerVation Protocol) or LDP (Label Distribution Protocol) messages, between an ingress node and an egress node of the LSP or between neighboring routers on the path from an ingress router to an egress router, so information in these messages can be acquired to be used for automatic discovery of LSPs, too. In further alternative method, automatic discovery of nodes is first completed, and thereafter information on links and LSPs that the discovered nodes have is acquired using the SNMP, telnet, or the like on these nodes.

Figure 2:
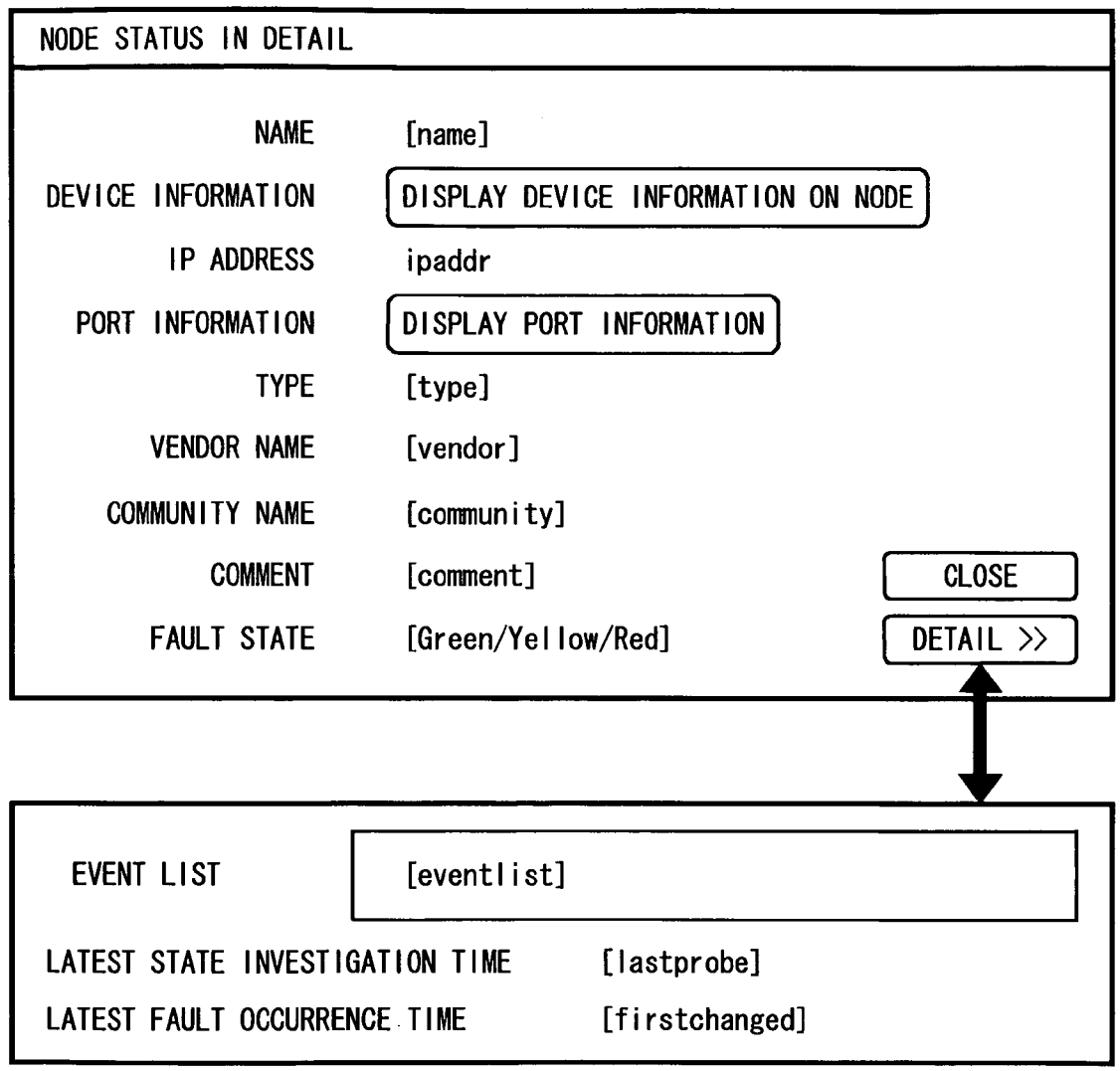
FIG. 2 shows a screen example in which node information registered in an information storage section 18 is displayed on an information display section 24.
Figure 3:
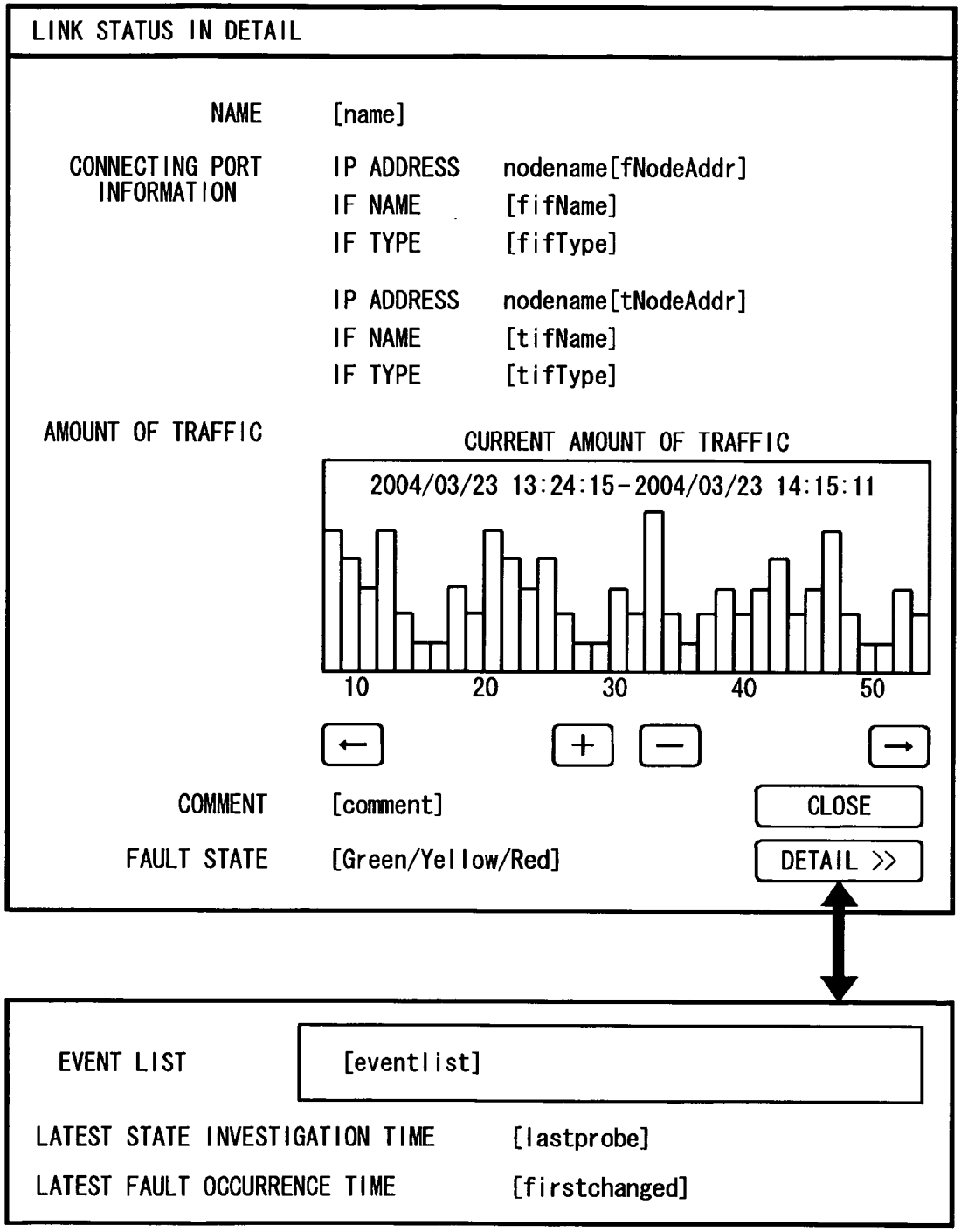
FIG. 3 shows a screen example in which link information registered in the information storage section 18 is displayed on the information display section 24.
Figure 4:
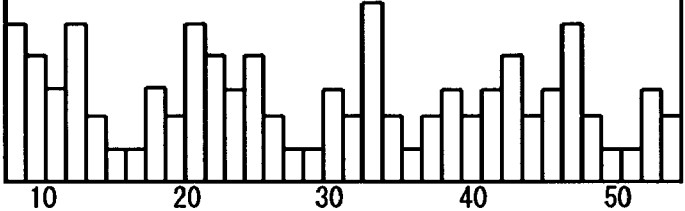
FIG. 4 shows a screen example in which LSP information registered in the information storage section 18 is displayed on the information display section 24.

The information collection section 12 receives specification of the scope of nodes to be investigated from the user input section 22 of the GUI 20 (arrow (1) in FIG. 1), and acquires node information, link information, LSP information, or the like from the specified nodes. Among the information acquired here, only a part of the information is chosen via the user input section 22 of the GUI 20 (arrow (3) in FIG. 1), and the part of the information is registered in the information storage section 18 by the information registration section 16. Only the registered nodes, links, LSPs, or the like then become objects to be monitored by the monitor section 40, and information obtained by monitoring is also stored in the information storage section 18. FIGS. 2 to 4 are display examples showing how the contents of the information stored in the information storage section 18 are displayed on the information display section 24.

In the example of FIG. 2, node information includes a node name, device information on the node (software version, or the like), information on port that the node has (type of Ethernet, IP address, or the like), a vender name, a community name for indicating that the SNMP request is from an authorized manager, miscellaneous comments, and the like. These pieces of information are registered at the time of automatic discovery, and may be rewritten with information acquired by monitoring. Information on the fault state acquired by monitoring is also recorded, and thus the degree of fault may be displayed in green, yellow, or red. In the meantime, an event list, the latest time of state investigation, the latest time of fault occurrence, and the like may be displayed when a button for displaying details is clicked. The latest time of state investigation is, for example, time when automatically discovered information is registered. If any information is obtained by monitoring afterwards, the time when the information is recorded through monitoring may be the latest time. Since this allows a user to know when information in the information storage section 18 is as of, execution of wasted automatic discovery can be avoided.

In the example of FIG. 3, link information includes a link name, port information on respective neighboring nodes connected by the link (including IP addresses, interface names, interface types, or the like), miscellaneous comments, and the like. These pieces of information are registered at the time of automatic discovery, and may be rewritten with information acquired by monitoring. Information on the fault state acquired by monitoring is also recorded. Such information may be displayed in the same manner as the case of node information. As for links, the amount of traffic flowing through each link can be obtained by monitoring, and thus the amount of traffic of the link varying from time to time can be displayed with its history.

In the example of FIG. 4, LSP information includes node names and IP addresses of the LSP's ingress node and egress node, an LSP name, a tunnel ID given to the LSP, path information comprising a group of nodes that the LSP goes through, a bandwidth allocated for the LSP, the priority of this LSP in setting up and holding when there are a plurality of LSPs to be set up and held but there are not enough resources, an LSP type (primary or backup in an operation where a primary LSP is used normally but it is switched to a backup LSP at the time of failure, or the like), the operating condition of the LSP (active or standby, or the like), information on the other LSPs in the same group (in a case where a plurality of LSPs that have the same ingress and egress points are set up), miscellaneous comments, and the like. These pieces of information are registered at the time of automatic discovery, and may be rewritten with information acquired by monitoring. Information on the fault state acquired by monitoring is also recorded, and such information may be displayed in the same manner as the case of node information. As for LSPs, the amount of traffic flowing through each LSP can be obtained by monitoring, and thus the amount of traffic of the LSP varying from time to time can be displayed with its history.

Information stored in the information storage section 18 is, for example, in a database format shown in FIG. 5. In FIG. 5, information is recorded for every item type and item identifier. Item types are node, link, and LSP in this example, and other type of information may be recorded, too. Only one element is listed for one type in FIG. 5, but actually the information storage section 18 stores information on many elements for one type. An item identifier is used for determining identity of the element at a process, described later, in the difference judgment section 14. Information recorded corresponding to item identifiers is generally shown in FIGS. 2 to 4. The information storage section 18 may be included in the network management server 10, or in a separately provided monitor server. Further alternatively, another database server may comprise the information storage section 18 so that the network management server 10 (or a monitor server) uses the information storage section 18 by communicating with the database server.

The difference judgment section 14 compares information registered in the information storage section 18 and information received from the information collection section 12. Whether the elements are identical or not is determined by comparing, for example, node IDs (e.g. IP addresses), in a case of nodes. In a case of links, for example, sets of IP addresses of both ends, or node IDs and port numbers are compared for the determination. In a case of LSPs, for example, sets of node IDs and LSP names, sets of node IDs and tunnel IDs, or the like are compared for the determination.

The difference judgment section 14 notifies the information display section 24 of the GUI 20 (arrow (2) in FIG. 1) of: an element whose information the difference judgment section 14 has received from the information collection section 12 with no identical element stored in the information storage section 18 as an object that may be newly registered; an element whose information the difference judgment section 14 has not received from the information collection section 12 but is stored in the information storage section 18 as an object that may be deleted; and an element whose information the difference judgment section 14 has received from the information collection section 12 with the identical element stored in the information storage section 18 is an object that may be updated.

A user (network administrator) views the contents of information displayed as above on the information display section 24, and decides whether an element notified as an object that may be newly registered is actually to be registered in the information storage section 18 or not, whether an element notified as an object that may be deleted is actually to be deleted from the information storage section 18 or not, or whether information on an element notified as an object that may be updated is actually to be written over the information storage section 18 or not. The user then informs the information registration section 16 of the result of the decision as his/her choice.

Figure 15:
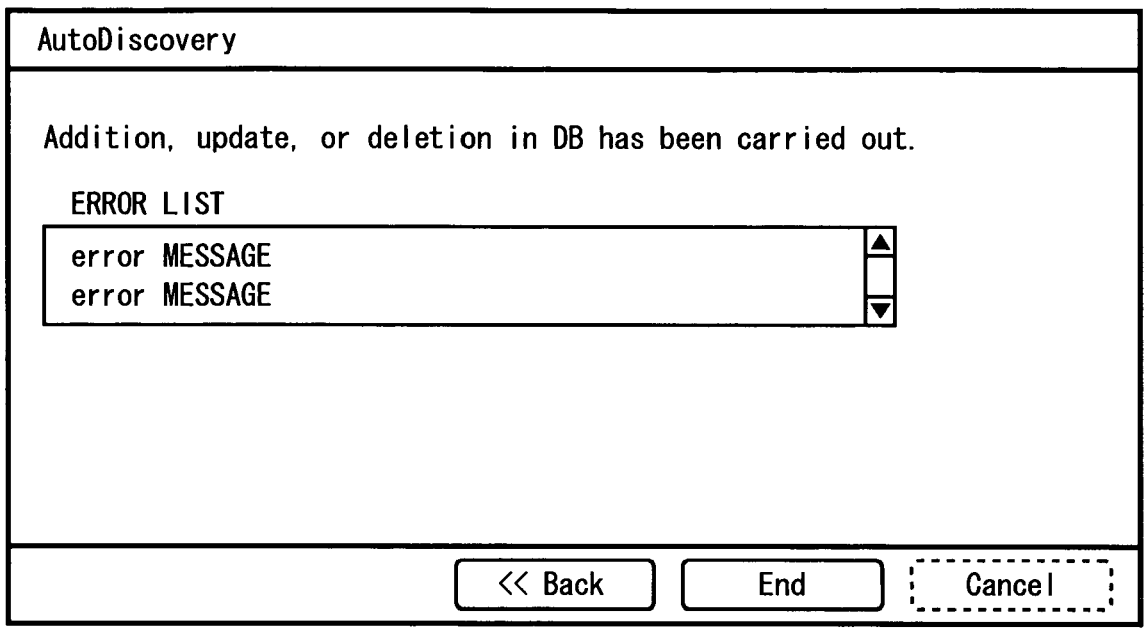
FIG. 15 shows an example of a screen that displays an LSP registration result.
Figure 16:
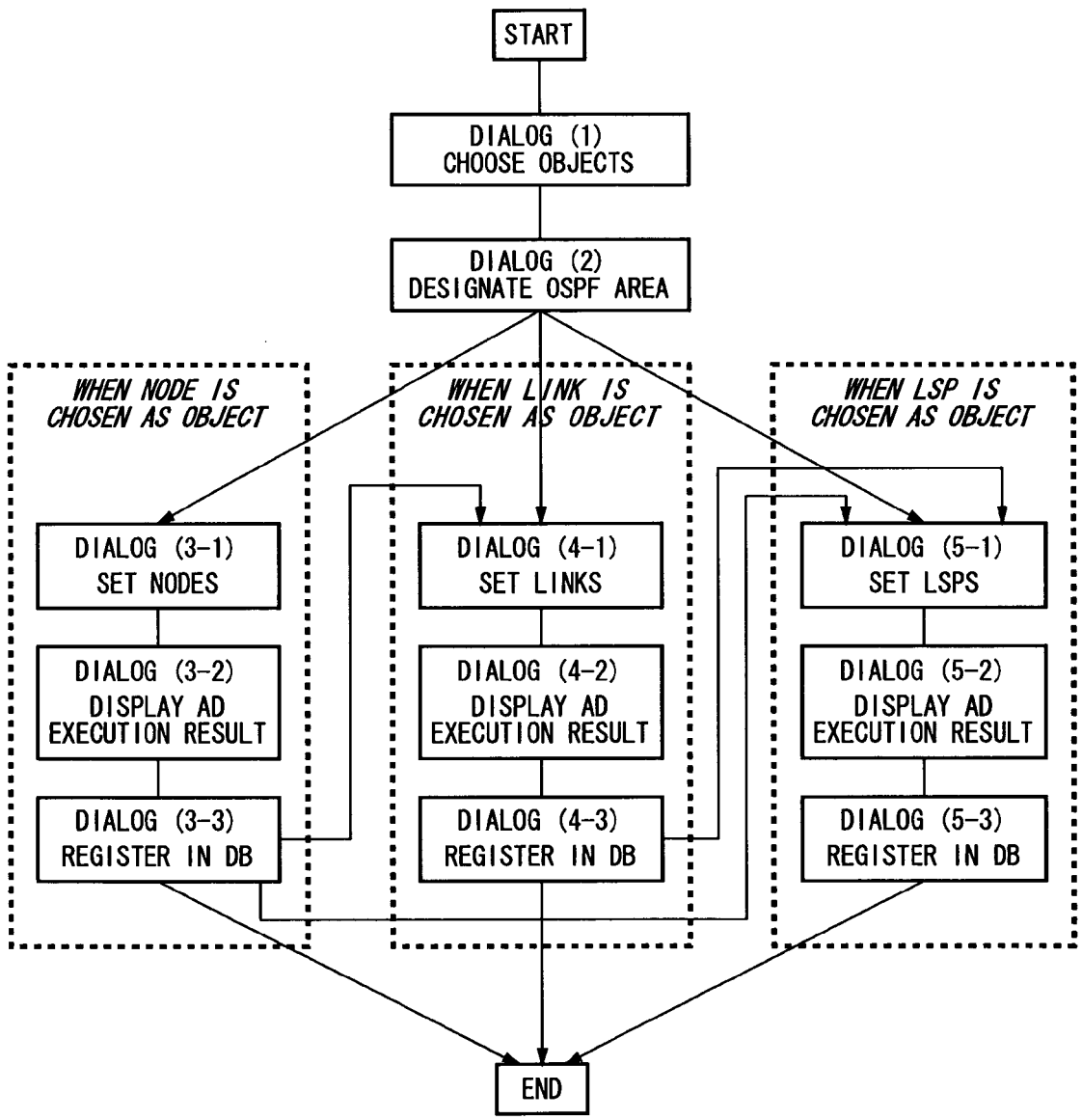
FIG. 16 shows an example of a process performed by the network management server 10.

FIGS. 6 to 15 shows an example of a GUI screen transition from the start of automatic discovery via a user's choice to the completion of registering information in the information storage section 18 (new registration, deletion, or update). FIG. 16 illustrates a process performed by the network management server 10 over the transition.

According to the flowchart of FIG. 16, the network management server 10 first allows a user to designate a type to be an object of automatic discovery (one or more of node, link, and LSP) from the GUI screen of FIG. 6 (dialog (1)). Three types are shown here, and additionally, for example, session information and/or path information of the above-described OSPF, IS-IS, BGP, LDP, or the like, or other various information may be chosen as types to be discovered. If the operation is that all types of elements are to be discovered when automatic discovery is performed, the screen of dialog (1) is not required to be shown.

If node only, link only, or LSP only is designated, only dialogs (3-1) to (3-3), dialogs (4-1) to (4-3), or dialogs (5-1) to (5-3) are carried out, respectively. If node and link are designated, dialogs (3-1) to (3-3) and then dialogs (4-1) to (4-3) are carried out. If link and LSP are designated, dialogs (4-1) to (4-3) and then dialogs (5-1) to (5-3) are carried out. If node and LSP are designated, dialogs (3-1) to (3-3) and then dialogs (5-1) to (5-3) are carried out. If all of node, link, and LSP are designated, dialogs (3-1) to (3-3), dialogs (4-1) to (4-3), and dialogs (5-1) to (5-3) are carried out in this order.

In a case where the OSPF (or IS-IS) is working in the environment, the network management server 10 may then allow the user to designate via the GUI screen an OSPF area in which automatic discovery is to be performed (dialog (2)). A group of nodes to be automatically discovered can then be specified based on OSPF routing information.

On the next step, If node is chosen as a type to be an object of automatic discovery, the network management server 10 allows the user to designate via the GUI screen of FIG. 7 a node to be automatically discovered (dialog (3-1); corresponding to arrow (1) in FIG. 1). If "Discover all nodes" is chosen here, all nodes in the OSPF area specified in dialog (2) is designated (all nodes in the whole network are designated if any OSPF area has not been specified in dialog (2)). If "Discover designated nodes only" is chosen, a list creating screen for designating each node becomes operative, and therefore desired nodes can be designated as objects of automatic discovery by, for example, inputting or choosing node IDs. In addition, designation can be made in such a manner that a user sets nodes to be omitted from objects of automatic discovery.

When the user completes designation as above and clicks the "Next" button, the network management server 10 performs automatic discovery targeting designated nodes, and on completion of this discovery displays the GUI screen of FIG. 8 (dialog (3-2); corresponding to arrow (2) in FIG. 1). For such display, in the network management server 10, the information collection section 12 passes node information collected from nodes to the difference judgment section 14, which compares information in the information storage section 18 and the information from the information collection section 12, and classifies the nodes as nodes that may be newly added, nodes whose information may be updated, or nodes that may be deleted. Viewing the node information classified as above and displayed, the user can decide which nodes are to be registered and which nodes are not to be registered in the information storage section 18.

On the screen of FIG. 8, lists of classified nodes are displayed by, for example, node name, and when a node name is double-clicked, detailed information on the node obtained by the information collection section 12 is displayed. The user can therefore decide whether a node is to be registered in the information storage section 18 as an object to be monitored or not, after getting to know detailed information on each node. In the list of nodes that can be newly added, the user clicks the checkbox "Add" for a node that the user has decided to register; in the list of nodes whose information can be updated, the user clicks the checkbox "Update" for a node that the user has decided to update (nodes not checked may continue to be registered with old information in the information storage section 18, or may be deleted from the information storage section 18); and in the list of nodes that can be deleted, the user clicks the checkbox "Delete" for a node that the user has decided to discontinue the registration (nodes not checked will continue to be registered in the information storage section 18).

Here, nodes that belong to the same domain have the same lower suffix in their node names, and it may not be easy for a user to distinguish nodes if they are displayed in such a manner that the same lower suffix attaches to many nodes. A set field may therefore be prepared to delete such suffix.

Also, a screen on which nodes currently registered in the information storage section 18 are represented as a network topology map may be displayed along with the screen of FIG. 8 so that, when a node name listed as a node that can be updated or deleted is clicked on the screen of FIG. 8, the node is highlighted on the map. This further helps the user in deciding whether the node is to be registered or not.

If an error occurred in automatic discovery, an error message and information on what node the error is related to are displayed. After viewing the information and removing the cause of the error, the user can do automatic discovery again by pushing "Execute Rediscovery" button.

After choosing to add, update, or delete as above, the user clicks the "Next" button (dialog (3-3); corresponding to arrow (3) in FIG. 1). Then, in the network management server 10, information on nodes chosen to be added or updated is passed from the difference judgment section 14 (or the information collection section 12) to the information registration section 16 and is registered in the information storage section 18, whereas information on nodes chosen to be deleted is deleted from the information storage section 18 by the information registration section 16. The GUI screen shown in FIG. 9 is then displayed as a screen indicating that the registration has been completed (or that an error occurred).

Figure 9:
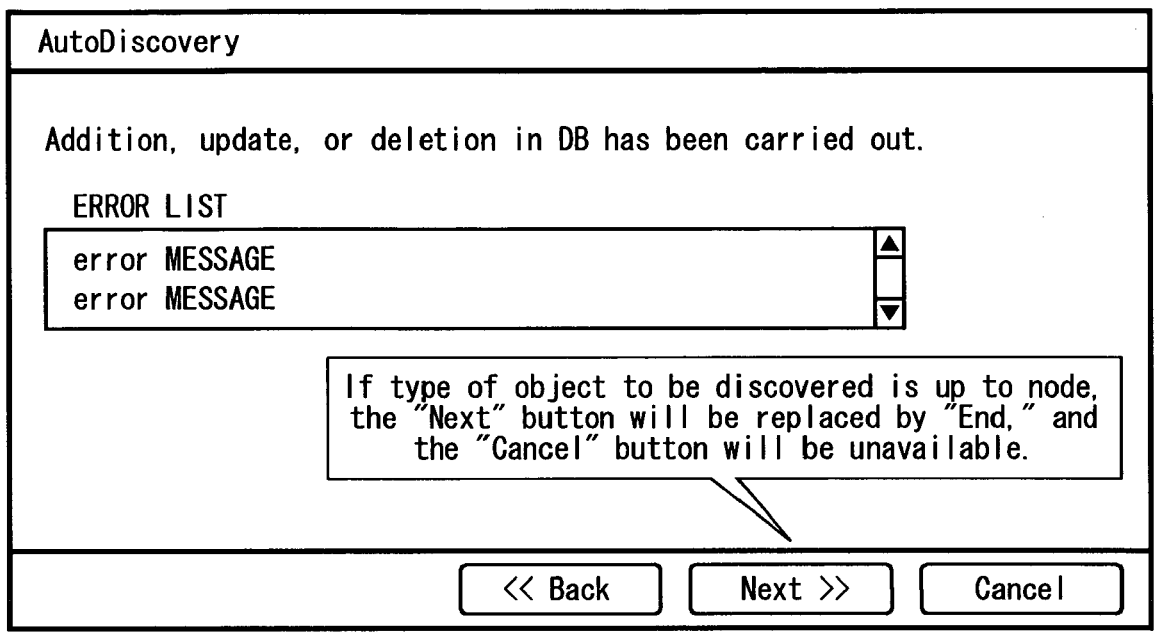
FIG. 9 shows an example of a screen that displays a node registration result.

If a type chosen in FIG. 6 is node only, the "End" button is displayed on the lower part of the screen of FIG. 9, and the process of automatic discovery finishes. If link or LSP is chosen in addition to node in FIG. 6, the "Next" button is displayed on the lower part of the screen of FIG. 9 (the "Cancel" button is additionally displayed for when the user chose link or LSP but wants to discontinue on the way). If link is included in types chosen in FIG. 6, and the "Next" button is clicked, the GUI screen of FIG. 10 is displayed.

The network management server 10 allows the user to designate via the GUI screen of FIG. 10 a link to be automatically discovered (dialog (4-1); corresponding to arrow (1) in FIG. 1). If "Discover all links" is chosen here, all links connected to nodes registered in the information storage section 18 are specified. This allows automatic discovery to be limited to links that may require to be monitored. If "Discover only links included in OSPF area" is chosen, all links in the OSPF area specified in dialog (2) are designated. If "Discover only links between designated nodes" is chosen, a list creating screen for designating each node becomes operative, and therefore links between desired nodes can be specified as objects of automatic discovery by, for example, inputting or choosing node IDs. Additionally, in a case where there are a plurality of links between the same nodes, another list creating screen for designating each link may appear in order to designate a part of the plurality of links.

In addition, designation can be made in such a manner that a user sets links to be omitted from objects of automatic discovery. The omission of links can be realized by allowing a user to designate nodes to be omitted and omitting links connected to the nodes, and also by allowing a user to designate prefixes or netmasks of links to be omitted. The latter designation method is useful in such a case that one network for management use and another network for end users are formed among the same group of nodes and only links in one of the networks (usually the network for end users) are to be objects of automatic discovery or monitoring.

When the user completes designation as above and clicks the "Next" button, the network management server 10 performs automatic discovery targeting designated links, and on completion of this discovery displays the GUI screen of FIG. 11 (dialog (4-2); corresponding to arrow (2) in FIG. 1). For such display, in the network management server 10, the information collection section 12 passes link information collected from nodes to the difference judgment section 14, which compares information in the information storage section 18 and the information from the information collection section 12, and classifies the links as links that may be newly added, links whose information may be updated, or links that may be deleted. Viewing the link information classified as above and displayed, the user can decide which links are to be registered and which links are not to be registered in the information storage section 18.

On the screen of FIG. 11, lists of classified links are displayed by, for example, link identifier, and when a link identifier is double-clicked, detailed information on the link obtained by the information collection section 12 is displayed. The user can therefore decide whether a link is to be registered in the information storage section 18 as an object to be monitored or not, after getting to know detailed information on each link, and thus click the checkbox "Add," "Update," or "Delete." In addition, a screen on which links currently registered in the information storage section 18 are represented as a network topology map may be displayed along with the screen of FIG. 11 so that, when a link identifier listed as a link that can be updated or deleted is clicked on the screen of FIG. 11, the link is highlighted on the map. This further helps the user in deciding whether the link is to be registered or not.

If an error occurred in automatic discovery, an error message and information on what node the error is related to are displayed. After viewing the information and removing the cause of the error, or for the purpose of removing the cause of the error, the user can do automatic discovery again by pushing "Execute Rediscovery" button. For example, if "Discover links included in OSPF area" is chosen on the screen of FIG. 10 and then an automatically discovered link is connected to a node not registered in the information storage section 18, an error is displayed in FIG. 11. In this case, the user can, by doing "Execute Rediscovery," carry out automatic discovery of the required node, register the information in the information storage section 18, and then register the link with the error eliminated.

After choosing to add, update, or delete as above, the user clicks the "Next" button (dialog (4-3); corresponding to arrow (3) in FIG. 1). Then, in the network management server 10, information on links chosen to be added or updated is passed from the difference judgment section 14 (or the information collection section 12) to the information registration section 16 and is registered in the information storage section 18, whereas information on links chosen to be deleted is deleted from the information storage section 18 by the information registration section 16. The GUI screen shown in FIG. 12 is then displayed as a screen indicating that the registration has been completed (or that an error occurred).

Figure 12:
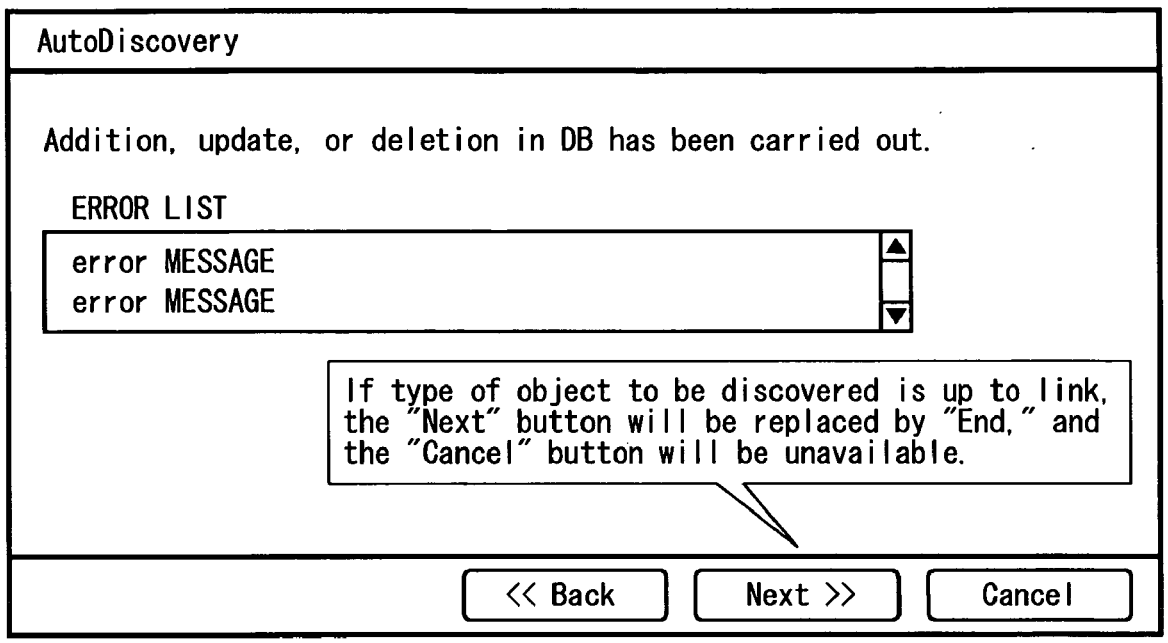
FIG. 12 shows an example of a screen that displays a link registration result.

If a type chosen in FIG. 6 is link only, or link and node only, the "End" button is displayed on the lower part of the screen of FIG. 12, and the process of automatic discovery finishes. If LSP is chosen further in FIG. 6, the "Next" button is displayed on the lower part of the screen of FIG. 12 (the "Cancel" button is additionally displayed for when the user chose LSP but wants to discontinue on the way). If the "Next" button is clicked, the GUI screen of FIG. 13 is displayed.

The network management server 10 allows the user to designate via the GUI screen of FIG. 13 an LSP to be automatically discovered (dialog (5-1); corresponding to arrow (1) in FIG. 1). If "Discover all RSVP-LSPs" is chosen here, all RSVP-LSPs set up on nodes registered in the information storage section 18 (e.g. an RSVP-LSP whose ingress node is a registered node) are specified. This allows automatic discovery to be limited to LSPs that may require to be monitored. If "Discover only RSVP-LSPs whose ingress nodes are designated nodes" is chosen, a list creating screen for designating each node becomes operative. Therefore, if the user inputs or chooses node IDs, for example, RSVP-LSPs having desired nodes as ingress nodes can be specified as objects of automatic discovery. RSVP-LSPs are objects in this example, but LDP-LSPs can be objects as well.

In addition, designation can be made in such a manner that a user sets LSPs to be omitted from objects of automatic discovery. The omission of LSPs can be realized by allowing a user to designate nodes to be omitted and by omitting LSPs having the designated nodes as ingress nodes, and also by allowing a user to designate prefixes or netmasks of links to be omitted and omitting LSPs passing through the links.

When the user completes designation as above and clicks the "Next" button, the network management server 10 performs automatic discovery targeting designated LSPs, and on completion of this discovery displays the GUI screen of FIG. 14 (dialog (5-2); corresponding to arrow (2) in FIG. 1). Automatic discovery of designated LSPs is carried out by sending an SNMP request or the like to nodes identified by the user designation on the screen of FIG. 13, and acquiring LSP information managed by the nodes. In order to display the screen of FIG. 14, in the network management server 10, the information collection section 12 passes LSP information collected from nodes to the difference judgment section 14, which compares information in the information storage section 18 and the information from the information collection section 12, and classifies the LSPs as LSPs that may be newly added, LSPs whose information may be updated, or LSPs that may be deleted. Viewing the LSP information classified as above and displayed, the user can decide which LSPs are to be registered and which LSPs are not to be registered in the information storage section 18.

On the screen of FIG. 14, lists of classified LSPs are displayed by, for example, LSP name, and when a LSP name is double-clicked, detailed information on the LSP obtained by the information collection section 12 is displayed. The user can therefore decide whether an LSP is to be registered in the information storage section 18 as an object to be monitored or not, after getting to know detailed information on each LSP, and thus click the checkbox "Add," "Update," or "Delete." In addition, a screen on which LSPs currently registered in the information storage section 18 are represented on a network topology map may be displayed along with the screen of FIG. 14 so that, when an LSP name listed as an LSP that can be updated or deleted is clicked on the screen of FIG. 14, the LSP is highlighted on the map. This further helps the user in deciding whether the LSP is to be registered or not.

If an error occurred in automatic discovery, an error message and information on what node the error is related to are displayed. After viewing the information and removing the cause of the error, or for the purpose of removing the cause of the error, the user can do automatic discovery again by pushing "Execute Rediscovery" button. For example, if "Discover RSVP-LSPs whose ingress nodes are designated nodes" is chosen on the screen of FIG. 13 and then an automatically discovered LSP passes through a node or link not registered in the information storage section 18, an error is displayed in FIG. 14. In this case, the user can, by doing "Execute Rediscovery," carry out automatic discovery of the required node and link, register the information in the information storage section 18, and then register the LSP with the error eliminated.

After choosing to add, update, or delete as above, the user clicks the "Next" button (dialog (5-3); corresponding to arrow (3) in FIG. 1). Then, in the network management server 10, information on LSPs chosen to be added or updated is passed from the difference judgment section 14 (or the information collection section 12) to the information registration section 16 and is registered in the information storage section 18, whereas information on LSPs chosen to be deleted is deleted from the information storage section 18 by the information registration section 16. The GUI screen shown in FIG. 15 is then displayed as a screen indicating that the registration has been completed (or that an error occurred). The user clicks the "End" button displayed here, and the process of automatic discovery finishes.

By using the embodiments described above, for example, a network administrator may be able to carry out automatic discovery of the network topology and monitor of the network status by designating and choosing desired objects to obtain sufficient information without increasing load on the network.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. A network management device, comprising:
a collection unit that repeatedly collects, by automatic discovery, information on elements in a network;
a memory device that stores information collected by the collection unit;
a registration unit that registers the element chosen by the user through the choice unit as an object to be monitored, the monitoring being performed by a process other than the automatic discovery; and
a control unit that controls the collection unit to collect, by the automatic discovery, information on both registered elements and not-registered elements, and controls the registration unit to keep a registered but not-discovered element as registered for the monitoring, where for the registered but not-discovered element, information was collected by a past automatic discovery but is not collected by a current automatic discovery,
wherein the control unit further controls the display unit to display a result of a comparison, the comparison being performed at the time of the current automatic discovery between elements which are being registered for the monitoring at the time of the current automatic discovery and elements on which information is collected by the current automatic discovery, whereby the user is enabled to choose the element to be subjected to the monitoring among (i) a not-registered and newly-discovered element, (ii) a registered and discovered element, and (iii) a registered but not-discovered element.

2. The network management device according to claim 1, further comprising
a monitor unit that acquires data for management of the network by inquiring about a current state of the element registered as the object to be monitored, and shows the data to the user.

3. The network management device according to claim 1, further comprising
a monitor unit that receives an event notification indicating a change in state of the network, and shows the user a notification concerning the element registered as the object to be monitored in distinction from a notification concerning an element not registered as an object to be monitored.

4. The network management device according to claim 1, wherein the control unit controls the display unit to display: (i) the not-registered and newly- discovered element as an element which can be added to the registration for the monitoring ; (ii) a registered and discovered element as an element which can be updated in the registration for the monitoring; and (iii) a registered but not-discovered element as an element which can be deleted from the registration for the monitoring.

5. The network management device according to claim 1, further comprising
a designation unit that allows the user to designate an element whose information is to be collected by the collection unit.

6. The network management device according to claim 5, wherein
the registration unit registers information on each element along with a date and time of registration, and
the designation unit includes a unit that shows the user the element registered by the registration unit along with the date and time of registration.

7. The network management device according to claim 1, further comprising
an instruction unit that allows the user to instruct that information on which kind of element in the network is to be collected by the collection unit among a node, a link, or a label switched path.

8. The network management device according to claim 1, wherein
the network includes a node and a link as elements,
the registration unit registers the node as the object to be monitored, and
the collection unit collects information on the link connected to the node registered.

9. The network management device according to claim 1, wherein
the network includes a node and a link as elements,
the registration unit registers the node as the object to be monitored, and
the control unit controls the display unit to display an error in a case where information collected by the collection unit is on the link not connected to the node registered.

10. The network management device according to claim 1, wherein
the network includes a node, a link, and a label switched path as elements,
the registration unit registers the node as the object to be monitored, and
the collection unit collects information on the label switched path set up regarding the node registered.

11. The network management device according to claim 1, wherein
the network includes a node, a link, and a label switched path as elements,
the registration unit registers the node as the object to be monitored and registers the link as the object to be monitored, and
the control unit controls the display unit to display an error in a case where information collected by the collection unit is on the label switched path not set up regarding the node registered and in a case where information collected by the collection unit is on the label switched path not using the link registered.

12. A non-transitory computer usable medium having computer readable program codes embodied therein for a computer functioning as a network management device connected with a network, the computer readable program codes comprising:
a collection code module causing the computer to repeatedly collect, by automatic discovery, information on elements in the network;
a display code module causing the computer to display information collected by the collection code module on a screen;
a choice code module causing the computer to allow a user to choose an element based on the information displayed by the display code module;
a registration code module causing the computer to register the element chosen by the user through the choice code module as an object to be monitored, the monitoring being performed by a process other than the automatic discovery; and
a control code module causing the computer to control information on both registered elements and not-registered elements to be collected by the automatic discovery, and to control a registered but not-discovered element to be kept as registered for the monitoring, where for the registered but not-discovered element information was collected by a past automatic discovery but is not collected by a current automatic discovery,
wherein the control unit further controls the display code module causes the computer to display a result of a comparison, the comparison being performed at the time of the current automatic discovery between elements which are being registered for the monitoring at the time of the current automatic discovery and elements on which information is collected by the current automatic discovery, whereby the user is enabled to choose the element to be subjected to the monitoring among (i) a not-registered and newly-discovered element, (ii) a registered and discovered element, and (iii) a registered by not-discovered element.

* * * * *